Nov. 19, 1968     G. A. SHIFRIN     3,411,921

METHOD OF MAKING A FOOD PACKAGE

Filed Jan. 3, 1968

INVENTOR.
GERALD A. SHIFRIN
BY

ATTORNEYS

United States Patent Office 3,411,921
Patented Nov. 19, 1968

3,411,921
METHOD OF MAKING A FOOD PACKAGE
Gerald A. Shifrin, 1875 Corporal Kennedy St.,
Bayside, N.Y. 11360
Filed Jan. 3, 1968, Ser. No. 700,320
5 Claims. (Cl. 99—171)

ABSTRACT OF THE DISCLOSURE

A method of making a food package containing both dairy products and fruits and vegetables wherein the dairy product is separated from the fruit or vegetable by either a thin, edible, rupturable gelatin membrane or a viscous layer of sugar solution.

---

Frozen foods have been on the market for some time and are in common use. For instance, it has been proposed to quick-freeze peas and similar foods by coating individual peas with a solution of agar or the like, placing a vacuum thereon while at an elevated temperature, whereby water is evaporated from the solution. The product is cooled, causing the coating to solidify, and then is chilled to below 9° C. to freeze the product. This system requires several steps and involves considerable equipment and expense. It is not adapted for a combination of different foodstuffs.

Another proposed method involves the use of a paper container, which is lined with ice formed in situ by special apparatus at below freezing temperatures. A beverage is introduced at sub-zero temperature, air is displaced therefrom; a layer of water is placed on the beverage, and the whole subjected to a deep freeze. This system also requires a substantial amount of handling, considerable apparatus and a number of steps, so that substantial expense is involved in the operation. It seeks only to provide a frozen beverage which is maintained in the frozen state during storage and it has no relation to combinations of foodstuffs which are to be preserved for substantial periods.

The present invention is directed to a method of treating two types of foodstuffs which, when mixed, tend to deteriorate in a relatively short time and must be consumed soon after the preparation thereof. The present method packages two such foodstuffs in a manner which preserves them for substantial periods of time without spoilage, and which may be consumed without the necessity of thawing a frozen product.

More specifically, the present system succeeds in introducing into a single container or package a vegetable or fruit, such as strawberries, peaches and others, with a dairy product, such as sour cream, pot cheese, cottage cheese and the like. It is well known that sour cream in contact with other foods, particularly of acid character, deteriorates in a relatively short time. Also, it is well known that sour cream cannot be frozen as freezing breaks down the emulsion and forms curds. In accordance with the present system, a combination with sour cream is made without freezing it, yet preserving both constituents.

In practicing the invention, there is used an ordinary paper cup or container such as those commonly used in food stores for holding various solid and liquid substances. Into the container there is introduced a foodstuff of the above character. A suitable liquid, such as one associated with the particular foodstuff, is poured into the container to cover the foodstuff and to provide a fairly smooth surface. The container is then subjected to a freezing temperature for a short time sufficient to freeze the surface only, although a deeper freeze might be used. However, when only the surface is frozen there is avoided the danger of damaging the foodstuff, which may be a delicate fruit. Flash freezing at a relatively high temperature (about −20° F.) for a short time (about 15 minutes) has given good results.

A solution of an organic, film-forming, edible substance in water of suitable solid content is poured onto the surface of the liquid. The amount of solution is just about enough to cover the surface. It freezes almost immediately to form a thin and impervious or rupturable, edible membrane. Thereafter, there is introduced one of the aforesaid dairy products to fill the container. The product is then placed in storage under refrigeration. Freezing thereof is not necessary and in most cases it is undesirable. The product has a shelf life equal to that of each of the constituents. In use, the cover is removed and the contents mixed as with a spoon which readily breaks the membrane.

An alternative method comprises the introduction of powdered sugar on the surface of the fruit layer. This forms a substantially gel-like layer and serves to separate the sour cream from the fruit quite effectively. This embodiment eliminates the need for freezing the fruit layer and is well adapted to continuous processing techniques.

The invention is more fully described in connection with the accompanying drawing constituting a part hereof and in which like reference characters indicate like parts, and in which.

As a specific example to illustrate the nature of the invention but not to limit it, there will be described the packaging of strawberries and sour cream.

There is provided a paper cup or container 1, into the bottom of which there are placed strawberries to fill about 30% of the volume of the cup. A water solution of gelatin is made with about 14 ounces of water to 3 ounces of the gelatin powder. It has been found that the kosher (vegetable) type of gelatin is eminently satisfactory as it produced a relatively hard and tough membrane, but one which is readily broken by a spoon.

Container 1 is filled to about point 3 with a strawberry syrup or potable liquid (FIG 2) and then the container is chilled to about 20° F. for about 15 minutes, or under such other conditions as will for a film of frozen syrup at point 3. Then, as seen in FIG. 3, the gelatin solution 4 is poured on the surface 3 and it solidifies forming an impervious membrane.

Figure 4:
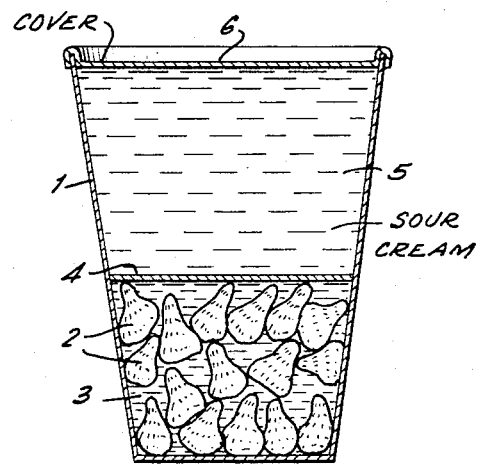

As shown in FIG. 4, sour cream 5 is filled into the top of container 1 and cover 6 is pressed on. The finished product is then kept under refrigeration until used.

Figure 1:
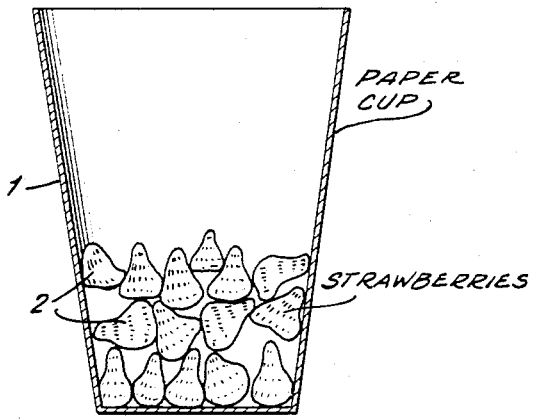
FIG. 1 is a vertical cross-sectional view of a container in the first step of the operation.
Figure 2:
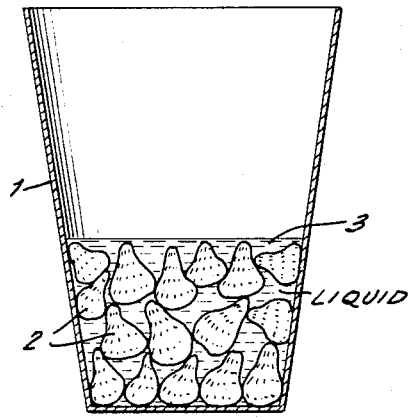
FIG. 2 is a view similar to FIG. 1 showing the next step in the operation.
Figure 3:
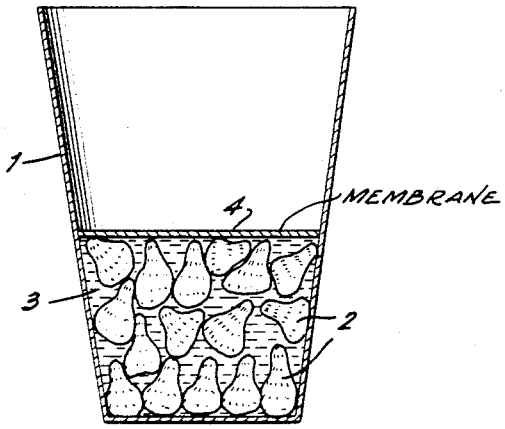
FIGS. 3 and 4 are similar views showing the third and fourth step in making the complete package.

The alternative method proceeds through the steps indicated in FIGS. 1 and 2 as above. Powdered sugar is sprinkled on the surface of the liquid. The container is then filled to the top as in FIG. 4 with sour cream or the like. The sugar dissolves in the fruit juice at the surface, forming a layer which is a suitable barrier for prevention of unwanted mixing of the contents. This method has the additional advantage of introducing only sugar into the product. By reducing the sugar content of the fruit initially, it is possible to compensate for the additional sugar required by this method. Thus, no taste variation will result from the use of this means.

This product preserves the flavor and texture of each constituent. The strawberries, not having been frozen, do not become mushy and the sour cream is not adversely affected either by freezing or by contact with the strawberries. The amount of gelatin used is usually not over 1% of the contents and it has no adverse effect on the taste or quality of the product.

The sour cream may have the usual butterfat content of 18% but other grades may be used. The relative amounts of fruit and sour cream may vary considerably but at present it is preferred to have about 25% to 35% of strawberries and 75% to 65% of sour cream. Other fruits or vegetables may be used, such as peaches, bananas, raspberries, apricots, scallions, peas, and others, and even mixtures thereof. The sour cream may be replaced in whole or in part by cottage cheese, pot cheese and others. These materials may contain other edibles, such as pineapple bits and other fruits. The gelatin may be flavored, if desired.

These and other variations of the details of the invention may be made in the practice thereof and the invention is to be broadly construed and to be limited only by the character of the claims appended hereto.

What is claimed is:

1. A method of making a food package which comprises the steps of placing a fruit or vegetable in the bottom of a container, covering said fruit or vegetable with a potable liquid, subjecting the surface only of said liquid to freezing, depositing on said frozen surface a solution of an organic film-forming rupturable edible substance in sufficient amount to cover said frozen surface, whereby said solution freezes on contact with the frozen surface of the potable liquid to form a barrier layer thereon, introducing into the upper part of said container and on said barrier layer a dairy product selected from the group consisting of sour cream, cottage cheese, and pot cheese, sealing the container, and storing the product under refrigeration.

2. A method according to claim 1 in which said solution is of gelatin.

3. A method according to claim 1 in which said liquid is a syrup of said fruit or vegetable.

4. A method according to claim 1 in which the barrier layer is formed by sprinkling sugar on the frozen surface of the liquid in sufficient amount to cover said frozen surface.

5. A method according to claim 4 in which said liquid is a syrup of said fruit or vegetable.

References Cited

UNITED STATES PATENTS

| | | | |
|---|---|---|---|
| 1,944,050 | 1/1934 | Wolkenhauer | 99—181 |
| 2,004,863 | 6/1935 | Gibson | 99—137 |
| 2,600,566 | 6/1952 | Moffett | 99—171 X |
| 2,667,422 | 1/1954 | Kauffman | 99—171 |
| 2,674,960 | 4/1954 | De Pasquale. | |

HYMAN LORD, *Primary Examiner.*